March 18, 1952 — L. J. B. LA COSTE ET AL — 2,589,710
FORCE MEASURING DEVICE
Filed June 11, 1948 — 3 Sheets-Sheet 1

FIG. 1

LUCIEN J. B. LaCOSTE
ARNOLD ROMBERG
INVENTORS

BY Lester B. Clark
& Ray L. Smith
ATTORNEYS

March 18, 1952     L. J. B. LA COSTE ET AL     2,589,710
FORCE MEASURING DEVICE Filed June 11, 1948     3 Sheets-Sheet 2

FIG. 2

LUCIEN J. B. LaCOSTE
ARNOLD ROMBERG
INVENTORS

BY Lester B. Clark
    Ray L. Smith
ATTORNEYS

March 18, 1952    L. J. B. LA COSTE ET AL    2,589,710
FORCE MEASURING DEVICE
Filed June 11, 1948    3 Sheets-Sheet 3

LUCIEN J. B. LaCOSTE
ARNOLD ROMBERG
INVENTORS

BY Lester B. Clark
& Ray L. Smith
ATTORNEYS

Patented Mar. 18, 1952

2,589,710

UNITED STATES PATENT OFFICE 2,589,710

FORCE MEASURING DEVICE

Lucien J. B. La Coste and Arnold Romberg, Austin, Tex.

Application June 11, 1948, Serial No. 32,386

7 Claims. (Cl. 73—382)

This invention relates to improvements in measuring instruments which make it possible to obtain measurements when a steady base for the instrument is not available. It is of particular importance in making underwater gravity meter measurements and in making ordinary gravity meter measurements in marshy areas and near volcanoes.

This application is a continuation-in-part of our copending application Serial No. 696,494, filed September 12, 1946.

The present invention utilizes the basic principles given in the above mentioned co-pending application but includes some refinements that make it possible to use the invention under less favorable conditions and also make it possible to obtain data more quickly.

An object of the invention is to obtain an underwater, remote controlled gravity meter with which gravity measurements can be made in rough weather and on soft bottoms.

Another object is to obtain a gravity meter which which gravity measurements can be made when the instrument is resting upon a support which undergoes seismic motions or motions similar thereto such as supports undergo in marshy land.

A further object of the invention is to prevent the moving beam in the gravity meter from striking its limiting stops when the gravity meter support is accelerated.

A still further object is to counterbalance large accelerations of the gravity meter support by introducing additional counterbalancing accelerations.

An additional object is to prevent such additional counterbalancing accelerations from introducing errors into the gravity measurements.

A further object is to damp out large initial kinetic energies that the gravity meter beam might have when it is first released or which it might acquire when the meter is badly jarred or which it ordinarily has when the beam is bouncing on the stops because of motion of the gravity meter support.

A still further object is to provide means for the operator to partially counterbalance such initial kinetic energies in order to obtain readings more quickly.

An additional object is to improve the operation of the invention as described in our copending application Serial No. 696,494.

The foregoing objects are primary objects and together with other objects will become more apparent by reference to the following description and accompanying drawings in which.

In view of the efforts to explore underwater and marshy areas attempts have been made to use ordinary gravity meters in underwater geophysical exploration by submerging them and allowing the meter to rest on the bottom. In these attempts, however, satisfactory results have been obtained only on calm days and only on bottoms which were relatively firm.

The importance of making a gravity meter for underwater use that can be employed on soft bottoms can hardly be overemphasized because a complete gravity map cannot be obtained otherwise in many regions. Furthermore, in view of the high cost of underwater gravity surveys it is extremely desirable that underwater gravity meters be capable of operation in weather that is not calm.

The failure of underwater gravity meters, heretofore known, to operate in rough weather or on soft bottoms is due to two difficulties:

(1) Water currents disturb the gravity meters; and (2) There are movements of the bottom upon which this instrument rests during the taking of readings. The first of these difficulties, namely, water currents, can be sufficiently reduced by streamlining the gravity meter and making it dense compared to the water or by various other means.

The second difficulty, namely, the motion of the bottom, can be resolved in rotations, horizontal translations, and vertical translations. The rotations are small and do not cause substantial trouble.

The horizontal translations are sometimes large enough to cause the moving system of a gravity meter to strike the stops provided in the meter housing for limiting the motion of the moving system. This motion must be kept small to avoid errors due to hysteresis in the gravity meter spring. However, considerable damping for relative horizontal motion between the gravity meter housing and moving system can be provided without interfering with the operation of the gravity meter. This will prevent horizontal translations from causing the movable system to engage the stops.

Vertical translations however are also large enough to cause the beam of the moving system to strike the stops but in this case the vertical damping in the gravity meter cannot be increased sufficiently to prevent the beam from hitting the stops without seriously affecting the operation of the gravity meter. Increased vertical damping increases the reading time by a prohibitive amount. Nor is it possible in general to prevent the beam from hitting the vertical stops by increasing the spacing of the stops without introducing prohibitive errors due to hysteresis in the gravity meter spring. Hysteresis errors can be kept small only by preventing the spring from changing its length appreciably.

If the moving system of a gravity meter can be prevented from hitting the stops, a reading can be obtained by averaging the position of the movable system or gravity meter beam. A satisfactory electrical averager can be made for a good gravity meter. A diagram of such an averager or integrator is included in Fig. 2 of this disclosure. The real problem therefore is to obtain a device which will prevent the gravity meter beam from hitting the vertical motion stops when the meter is subjected to vertical accelerations.

The present invention comprehends a device for temporarily displacing the frame which supports the moving system so that, during movement of the system, it will not strike the frame or stops provided. The displacing of the frame merely moves it out of the path of the moving system temporarily until the moving system starts back on its reverse swing and the frame is then returned to its initial position.

Such displacement of the frame avoids interference with the moving system so it does not affect the average beam position. Such movement of the frame prevents vertical translations of the ground from causing the beam to strike the stops by applying counterbalancing translations when the beam is near the stops. Obviously the counterbalancing translations or displacements of the frame will introduce errors into the measurement of gravity unless their average acceleration during the time of taking a reading is negligible. This condition is met by introducing suitable additional translations while the gravity meter beam is not in danger of striking either the top or bottom stops on the frame. The method of doing this will be made clear by a study of the device inself.

Figure 1:
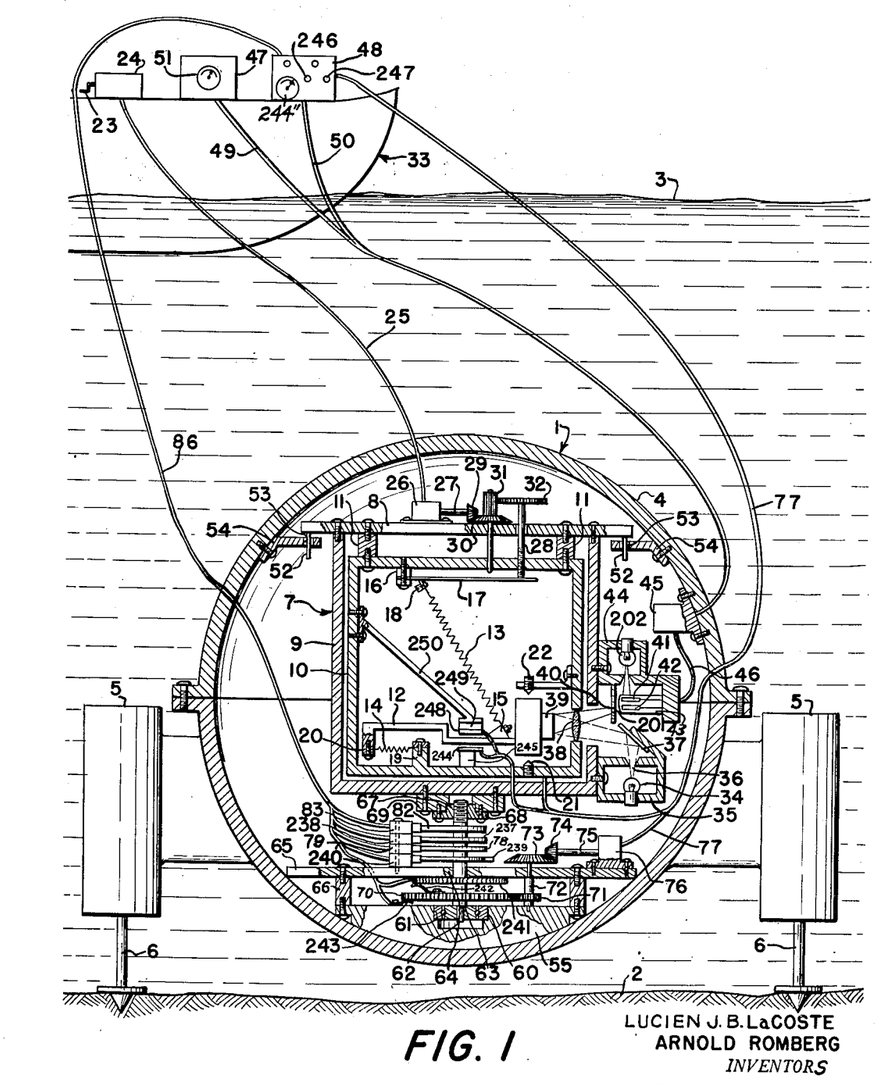
Fig. 1 is a side elevational view, partly in section, showing the preferred form of the invention.

In Fig. 1 the submersible portion 1 of a remote controlled gravity meter is shown resting on the bottom 2 below a body of water 3. The submersible portion 1 is shown as including a watertight container 4 fixed to leveling jacks 5 whose extensible members 6 rest on the bottom 2 of the body of water. The detailed construction of such jacks is to be found in our co-pending application Serial No. 678,204 filed June 21, 1946, for Leveling Device. The container 4 is leveled by varying the position of the extension members 6.

In the container 4 is mounted a gravity meter 7 of the general type shown in our Patents Nos. 2,293,437 and 2,377,889.

A brief description of the gravity meter will first be given as an aid in describing the invention. Gravity meter details to be described are not necessarily those for the best gravity meter design but instead are given for purposes of illustration since details of this nature are not a part of this invention. Gravity meter details are given in our above patents.

The gravity meter 7 includes a top plate 8, and outer housing 9, which are suitably secured together. The inner housing 10 is fixed to the top plate 8 through the heat insulating blocks 11. The gravity responsive beam 12 is suspended by the main spring 13 and the pair (one behind the other) of springs 14. The spring 13 is clamped to the beam 12 by the clamp 15 on the beam. The spring 13 is supported from the inner housing 10 through the block 16, the leaf spring 17, which is clamped to block 16, and the clamp 18 on the leaf spring. The pair of springs are clamped to the blocks 19 on the inner housing 10 and their opposite ends are clamped to the beam 12 by the clamps 20. It is therefore clear that the beam 12 will rotate about a horizontal axis under the influence of changes in gravity.

Rotation of the beam 12 is limited by the lower stop 21 and the upper stop 22, both of which are fixed with respect to the inner housing 10 in such a manner that the beam is limited in its movement to an extent that the spring 13 will not be subjected to appreciable hysteresis. The force of gravity on the beam is balanced by vertical adjustment of the clamp 18 to which the main spring 13 is clamped.

This vertical adjustment is produced by turning the crank 23 of the self-synchronous generator 24 which is electrically connected through cable 25 to the self-synchronous motor 26. The motor 26 turns as many revolutions as the generator 24. The shaft 27 of the motor 26 transmits rotation to the screw 28 through the gears 29, 30, 31, and 32. The lower end of the screw 28 presses against the leaf spring 17. As the screw 28 moves downwardly the clamp 18 on the leaf spring moves downwardly a smaller amount. The tension on the main spring 13 and therefore the equilibrium position of the beam 12 can thus be adjusted by suitable rotation of the crank 23 of the self-synchronous generator 24 on the boat 33.

A photoelectric cell system is used to give remote indications of the position of beam 12. The system includes an electric lamp 34 clamped in the bracket 35, which is fixed to the outer housing 9, and the lamp 202 clamped in the bracket 44 which is also fixed to the housing 9. No source of potential for lighting lamps 34 and 202 is shown in Fig. 1 in order to avoid complicating the drawing, but in practice the two lamps are connected in parallel to a battery on the boat 33. The two lamps 34 and 202 are matched so that battery fluctuations affect the amounts of light emitted by the two lamps substantially in the same ratio.

Lamp 202 is used as a standard lamp. A definite fraction of the light emitted by it falls upon the cathode 41 of the double photoelectric cell 43, which is fixed to the bracket 44.

Lamp 34 illuminates the slit 36 in the bracket 35. Light from the illuminated slit strikes the mirror 37 which is also fixed to the bracket 35; the light is reflected to pass through the converging lens 38 mounted on the inner housing 10. The light then is reflected from the mirror 39 fixed to the beam 12 and passes through the lens 38 again. The lens causes the light to converge and form an image 40 of the slit 36.

When the beam 12 is at its highest position the image 40 is formed in the slit 201 in the bracket 44, and therefore the light from it falls on the cathode 42 of the double photoelectric cell 43. But as the beam moves down part of the image 40 misses the slit 201 thereby reducing the amount of light that strikes the cathode 42. Generally the fraction of the total light from the standard lamp 202 that is allowed to fall on the cathode 41 is made equal to the amount of light from lamp 34 that falls on cathode 42 when the beam is at its mid-position or reference position. As the beam moves up more light will fall on cathode 42 than on cathode 41 and as it moves down less light will fall on cathode 42 than on cathode 41. The photoelectric cell 43 is electrically connected to the amplifier 45 through the cable 46. The amplifier gives a voltage output proportional to the difference in the amount of light falling on the two cathodes. Furthermore, the voltage output has one sign when beam 12 is near the top stop 22 and the other sign when the beam is near the bottom stop 21. Amplifiers capable of satisfying these conditions are well known in the art.

Figure 2:
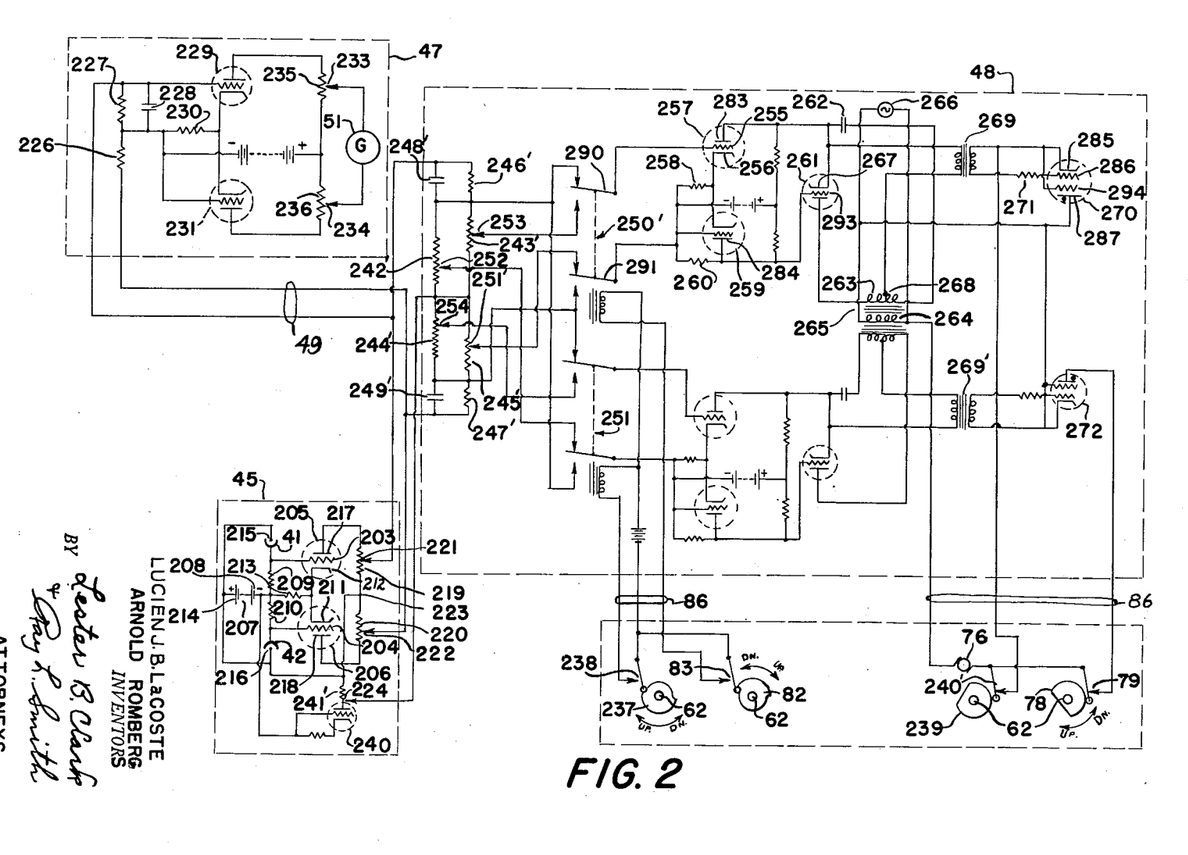
Fig. 2 is a wiring diagram of the main circuit of the invention including the integrating circuit and the servo circuit.

A diagram of such an amplifier is included in Fig. 2. The operation of the amplifier is as follows. The two cathodes 41 and 42 of the twin photoelectric cell 43 are connected respectively to the grids 203 and 204 of the approximately matched vacuum tubes 205 and 206. The grids 203 and 204 are also connected to the negative terminal 208 of the B battery 207 through the approximately equal high resistances 209 and 210 respectively. The negative terminal 208 is connected to the cathodes 211 and 212 of tubes 205 and 206 through the cathode biasing resistor 213. The positive terminal 214 of B battery 207 is connected to the anodes 215 and 216 of the twin photoelectric cell 43. The positive terminal 214 is also connected to the plates 217 and 218 of tubes 205 and 206 through the plate resistors 219 and 220 respectively. These resistors have variable taps 221 and 222.

The taps are adjusted so that when there is no light on the two photoelectric cell cathodes 41 and 42 the voltage between the taps 221 and 222 is approximately zero. This adjustment can be made accurately to zero but it cannot be maintained this way without further adjustment because of aging of the vacuum tubes 205 and 206 and because of impacts to which the tubes may be subjected. Therefore it will merely be assumed that the adjustment is made to make the voltage between taps 221 and 222 approximately zero. The actual value of this voltage at any time will be used as a reference voltage in determining the reference position of the beam 12.

Since the two tubes 205 and 206 are approximately matched, the voltage between taps 221 and 222 will remain approximately zero when the two photoelectric cell cathodes are equally illuminated regardless of the intensity of the illumination. The zero or reference position of beam 12 will be taken as the beam position which produces the same voltage between taps 221 and 222 regardless of whether the photoelectric cell cathodes are illuminated or not.

It should be noted that when the beam 12 moves upwardly, more light falls on cathode 42 which makes tap 221 more positive than tap 222 and when the beam moves downwardly less light falls on cathode 42 and tap 222 becomes more positive than 221. The function of vacuum tube 240 will be explained later in connection with the servo amplifier 48.

Connections from taps 221 and 222 are made to the averager or integrator 47 through the cable 49. The connections are made to the integrating or averaging circuit consisting of the resistors 226 and 227 and the condenser 228 which are connected as shown. The resistors 226 and 227 are made large compared to resistors 219 and 220 so as not to affect appreciably the operation of the amplifier just described. A good value for the time constant of the integrating circuit is about ten seconds. The averaged voltage appears across the condenser 228 and is applied between the grid and cathode of vacuum tube 229 through the cathode biasing resistor 230. Vacuum tube 231 is connected to tube 229 to act as a phase inverter in order to make it possible to obtain approximately zero voltage on the galvanometer 51 when the voltage across condenser 228 is zero. Of course this requires suitable adjustment of the taps 233 and 234 on the plate resistors 235 and 236.

The reference position of galvanometer 51 corresponding to the reference position of beam 12 is, of course, its reading when the photoelectric cell cathodes 41 and 42 are not illuminated and electric transients in the averaging circuit have been allowed time to die out. The deflection of the galvanometer 51 from this reference position when the photoelectric cell cathodes are illuminated then indicates the magnitude and direction of the averaged deflections of the gravity meter beam 12 from its predetermined zero or reference position.

The parts of the underwater gravity meter which have been described up to this point are sufficient to enable measurements of gravity to be made when there are not appreciable disturbances on the bottom of the body of water, that is, when the disturbances are not large enough to cause the beam 12 to strike the stops 21 and 22 very often. Readings are taken by merely rotating the crank 23 until the meter 51 on the averager indicates its reference reading and noting the total angular displacement in revolutions and fractions thereof of the crank from a predetermined reference position. The difference in gravity at two stations is proportional to the difference in angular displacements of the crank required to obtain readings at the two stations.

The present invention relates particularly to the portions of the underwater gravity meter which eliminate the bumping of the beam on the stops and will now be described.

The top plate 8 of the frame of the gravity meter 7 has two vertical rods 52 fixed to it. These rods can slide freely in holes 53 in brackets 54 which are fixed to the watertight container 4. The outer housing, or frame 9, is thereby capable of being translated or displaced vertically relative to the container 4 but not horizontally.

Predetermined amounts of vertical translation are made possible by means of the following construction. The Bakelite (or other heat insulating material) piece 55 is fixed to the container 4. The ball bearing 60 is pressed into the hole 61 in the piece 55. The shaft 62 is pressed into the inner race of the ball bearing 60 and has a shoulder 63 which fits against the top of the inner race. The ball bearing thus takes downward thrust exerted by the shaft 62.

A second bearing 64 for shaft 62 is provided by the plate 65 which is fixed to the piece 55 through the Bakelite blocks 66. A threaded portion 67 is provided on the upper end of shaft 62. This threaded portion engages a nut 68 which is fixed to the outer housing 9 through the Bakelite spacer 69. A gear 70 is fixed to shaft 62. This gear engages gear 71 which is fixed to countershaft 72. The bevel gear 73 is also fixed to countershaft 72 and engages the bevel gear 74 which is fixed to the shaft 75 of the reversible electric motor 76. The electric motor is fixed to plate 65 and is controlled by the servo amplifier 48 through the cable 77. From the preceding description it can be seen that when the motor shaft 75 rotates, the outer housing 9 is translated vertically.

Figure 3:
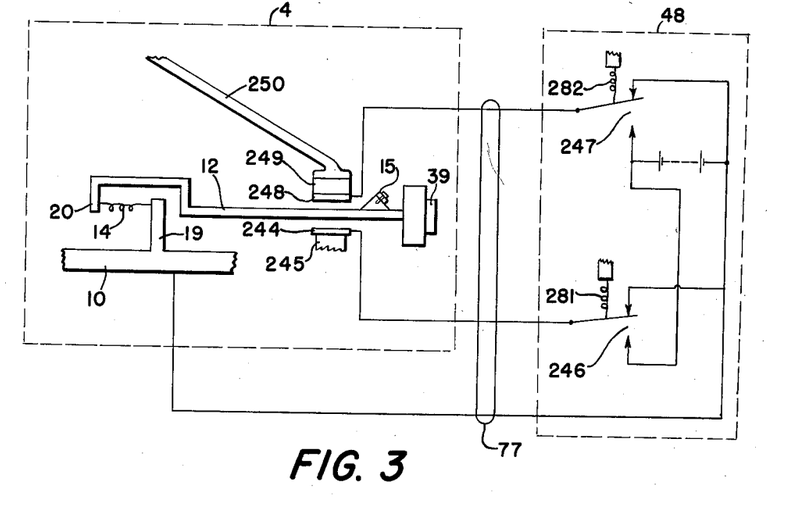
Fig. 3 is a wiring diagram of the circuit for quickly applying substantial torques to the gravity responsive beam of the meter.

The lower condenser plate 244 is secured to the insulating block 245 which is in turn secured to the inner housing 10. The condenser plate 244 is electrically connected to one of the conductors in the multiple conductor cable 77. Another conductor of cable 77 is connected to the inner housing 10 which is electrically connected to the beam 12 through the support 19 and spring 14. It is thus possible to apply a voltage between the beam 12 and the lower condenser plate 244. The circuit for applying the voltage is shown in Fig. 3.

Switch 246 on the panel of unit 48 is used to apply the voltage when desired. Spring 281 holds switch 246 normally in the up position so that there is no voltage between the beam 12 and condenser plate 244, except when switch 246 is held down. The purpose of applying this voltage is to effect a downward electrostatic force to the beam 12 in order to reduce large upward velocities that the beam might have acquired from bouncing on the stops because of earth motion.

The condenser plate 248 is used to apply a similar upward force. Plate 248 is secured to the insulating block 249 which is in turn secured to arm 250. This arm is in turn secured to the inner housing 10. The condenser plate 248 is also electrically connected to a conductor in the multiconductor cable 77. Voltage between condenser plate 248 and beam 12 is controlled by switch 247 as shown in Fig. 3. Spring 282 normally holds the switch 247 in the up position in Fig. 3 thus keeping condenser plate 248 and beam 12 at the same potential except when the switch is operated.

The cams 78 and 239 are fixed to shaft 62 and operate respectively the limit switches 79 and 240'. The lower limit switch 79 prevents the motor 76 from lowering the housing 9 below a certain limiting position in the watertight container 4. Similarly the upper limit switch 240' presents the motor 76 from raising the housing 9 above a certain limiting position in the container 4. These cams and limit switches are also shown in Fig. 2 and their operation will be given in more detail hereafter.

The cams 82 and 237 are also fixed to shaft 62 and operate respectively switches 83 and 238. These two switches change the response of the servo amplifier 48 according to the relative position of housing 9 and the container 4. These cams and switches are also shown in Fig. 2 and their operation will be given in detail later.

Figure 4:
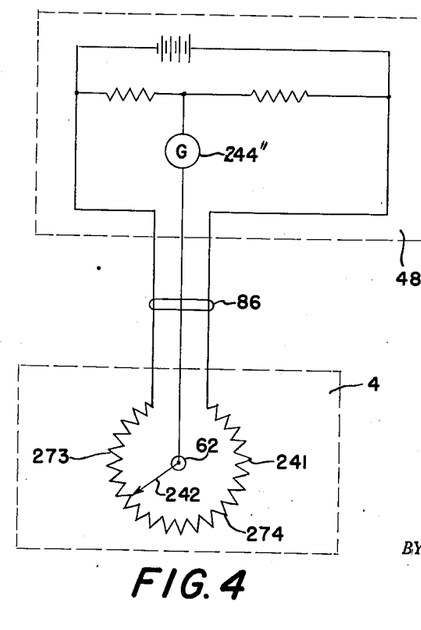
Fig. 4 is a wiring diagram of the circuit for indicating the vertical position of the gravity meter heater box with respect to the container which encloses it.

An annular potentiometer winding 241 is fixed to the Bakelite plate 65 which is in turn fixed to the watertight container 4. The sliding contact on the potentiometer is provided by the leaf spring 242 which is screwed to the conducting gear 70. Electrical contact with the conducting gear 70 is made by the second leaf spring 243 which is fixed to the Bakelite block 55, and which is electrically connected to one of the wires in the multiconductor cable 86. Other wires in cable 86 are soldered to the two ends of the potentiometer winding 241. The function of this potentiometer assembly is to give a visual indication on meter 244" of the vertical position of housing 9 with respect to the watertight container 4. The potentiometer circuit is shown in Fig. 4; its operation of meter 244" will be given in detail later.

The servoamplifier 48 receives its inputs from the beam position amplifier 45 and from switches 79, 240', 83, and 238; the output of the servoamplifier is supplied to the motor 76 which controls the vertical translation of housing 9 with respect to container 4. The operations which the servoamplifier causes the motor to perform are as follows:

(1) When housing 9 is approximately at the midpoint of its vertical motion with respect to container 4, the motor 76 moves housing 9 upward when beam 12 approaches upper stop 22 closely, and the motor moves housing 9 downward when beam 12 approaches lower stop 21 closely. The motor does not operate when beam 12 is not near either stop. In this way the motor prevents beam 12 from striking either stop.

(2) When the housing 9 is appreciably below the midpoint of its vertical motion with respect to container 4, motor 76 acts to keep beam 12 near but not touching the lower stop 21. The result of keeping beam 12 near the lower stop instead of allowing it to move toward the other stop as in case (1) is to raise housing 9, or to bring it back toward its midpoint with respect to container 4, whenever the beam is not in danger of striking a stop.

(3) When the housing 9 is appreciably above its midpoint, the motor 76 acts to keep beam 12 near but not touching the upper stop 22. The result of keeping the beam near the upper stop is to lower the housing 9, or to bring it back toward its midpoint with respect to container 4 whenever the beam is not in danger of striking a stop.

The way in which the servoamplifier produces these results can be understood from a study of the circuit diagram of the servoamplifier, which is shown in Fig. 2.

In the previous discussion of the operation of the amplifier 45 of Fig. 2 the following points were explained. When the beam 12 is at its reference position, approximately equal amounts of light fall on the two cathodes 41 and 42 of the twin photoelectric cell 43, and the voltage drop from point 223 to 221 is approximately equal to the voltage drop from point 223 to 222. As beam 12 moves upwardly the amount of light falling on cathode 42 increases and the potential of 222 decreases with respect to that of 223. Similarly when the beam moves downwardly, the amount of light falling on cathode 42 decreases and the potential of 222 increases with respect to that of 223.

It is also to be noted that even when no light falls on the photoelectric cell 43 there is still a considerable voltage drop between point 223 and 221 or 222. In order to partially or completely balance out these voltage drops occurring when the photoelectric cell is not illuminated, tube 240 is used. The tap 224 on the plate resistor 241' of this tube is adjusted so that when no light falls on the photoelectric cell the potential of point 224 is about the same as that of point 221 or 222. With this adjustment it can be seen that when light is allowed to fall on the photoelectric cell the amount of light falling on cathode 42 is approximately proportional to the voltage between 224 and 222 and the amount of light falling on cathode 41 is approximately proportional to the voltage between 224 and 221. The exactness of this proportionality is somewhat reduced by the effect of the cathode resistor 213 but this effect can be largely compensated for by properly adjusting tap 224. It is not necessary that exact proportionality exist.

The purpose of obtaining two voltages which are approximately proportional to the amounts of light falling on the two cathodes is as follows. It is desired to find a voltage which is zero when the beam 12 is at a given position or in other words it is desired to find a voltage which is zero when a definite ratio exists between the amounts of light falling on the two cathodes regardless of the absolute magnitudes of the light intensities. If two voltages are available which are proportional to the amounts of light falling on the two cathodes, it is merely necessary to compare the correct fraction of one voltage with the other voltage in order to obtain the required zero voltage. The fractions of the voltages can be obtained with potentiometers. In Fig. 2 the potentiometers 242' and 243' are used to obtain two different fractions of the voltage 224—221 to compare with the voltage 224—222 in order to determine two different positions of beam 12. Similarly the potentiometers 244' and 245' are used to determine two different fractions of the voltage 224—222 to compare with the voltage 224—221 in order to determine two more positions of beam 12. The function of resistors 246' and 247' and condensers 248' and 249' is to differentiate or filter the voltages under consideration in order to improve the stability and response of the servo system being described. The use of such differentiating or filtering networks is well known in the servomechanism art; see for example chapter VII in "Servomechanism Fundamentals" by Lauer, Lesnick, and Matson (published by McGraw-Hill).

The potentiometers 242', 243' 244', and 245' are connected to the contacts of the two double pole double throw relays 250' and 251 as shown in order that on the two tongues of either relay there will appear a comparison of one of the two voltages 224—221 or 224—222 (after some filtering) with a fraction of the other. When either relay is energized, a different comparison is made or in other words a different beam position is determined by the vanishing of the voltage between the relay tongues. Each relay can pick out one of two beam positions.

Relay 250' picks out one of the two beam positions at which the motor 76 begins to raise the housing 9 with respect to container 4. Similarly relay 251 picks out one of the two beam positions at which the motor 76 begins to lower housing 9 with respect to container 4.

It has been mentioned that when housing 9 is approximately at the midpoint of its vertical motion with respect to container 4, motor 76 should move housing 9 upwardly only when beam 12 approaches the upper stop 22 closely and motor 76 should move housing 9 downwardly only when beam 12 approaches the lower stop 21 closely. This is accomplished as follows. When housing 9 is approximately at the midpoint of its vertical motion with respect to container 4, cams 237 and 82 are at such positions that switches 238 and 83 are both open. Neither one of relays 250' and 251 is then energized. Potentiometers 245' and 242' then control the operation of the motor 76. Contact 252 of potentiometer 242' is adjusted to cause housing 9 to move downwardly when beam 12 is near the lower stop, thus preventing the beam from striking the lower stop. Similarly contact 251' of potentiometer 245' is adjusted to cause housing 9 to move upwardly when beam 12 is near the upper stop. When the beam is not near either stop, the motor does not operate.

The second condition to be satisfied is as follows. When housing 9 is appreciably below the midpoint of its vertical motion with respect to container 4, motor 76 should keep beam 12 near, but not touching the lower stop. When housing 9 is appreciably below its midpoint, cam 82 closes switch 83 but switch 238 remains open. Relay 250' is therefore energized but relay 251 remains unenergized. Since in the preceding case relay 251 caused housing 9 to be lowered to prevent the beam from hitting the lower stop when the beam got close to the stop, it will continue to do so in this case. However it is now required to move housing 9 upwardly if beam 12 gets very far away from the lower stop. Contact 253 of potentiometer 243' is adjusted to produce this result.

The third condition to be satisfied is a follows. When housing 9 is appreciably above the midpoint of its vertical motion with respect to container 4, motor 76 should keep the beam 12 near but not touching the upper stop. When housing 9 is appreciably above its midpoint, cam 237 closes switch 238 while switch 83 is open. Relay 251 is now energized while relay 250' is not. The potentiometer 245' on relay 250' is already properly adjusted to prevent the beam from getting too close to the upper stop. Contact 254 on potentiometer 244' is then adjusted to move housing 9 down whenever beam 12 gets far from the upper stop, thus keeping the beam from getting too far from the upper stop.

The way in which the voltage between the tongues of a relay operates motor 76 is now explained. Consider relay 250'. The voltage between its tongues 290 and 291 is applied between the grid 255 and cathode 256 of tube 257 through the cathode resistor 258. Of course the connections must be made with the proper polarity to cause the motor 76 to move when the beam approaches the upper stop rather than when it moves away from the upper stop. Tube 259 is connected to tube 257 as a phase inverter.

Resistor 260 is connected as shown to give the proper bias to the grid of the next tube 261. The plates 283 and 284 of tubes 257 and 259 are connected to the cathode 267 and grid 293 respectively of tube 261 which acts as a resistance in the phase shifting circuit composed of tube 261, condenser 262, and of course the transformer winding 263 of transformer 265. The primary 264 of the transformer 265 is energized by the A. C. source 266 which also supplies the energy which drives motor 76. As the signal on tube 261 is varied the plate resistance of the tube changes thereby changing the phase of the current in the phase shifting circuit. The use of phase shifting circuits to drive thyratrons in servo systems is well known; see p. 284 "Principles of Electron Tubes" by H. J. Reich (McGraw-Hill).

The output of the phase shifting circuit is taken from the cathode 267 and the center tap 268 of transformer winding 263. This output is applied to the primary of the isolating transformer 269. The output of transformer 269 is applied to the cathode 285 and control grid 286 of the thyratron 270 through the grid resistor 271.

The suppressor grid 294 of the thyratron 270 is connected to the cathode 285. The plate 287 of thyratron 270 is connected to one side of the A. C. source 266 and the cathode 285 is connected to the other side of the A. C. source through the permanent magnet motor 76. The operation of the branch of the circuit for reverse operation of motor 76 is similar except that the thyratron 272 is connected with opposite polarity in order to obtain the reversed rotation. The thyratron 272 need not be connected with opposite polarity if a split series motor be used. A permanent magnet motor is used in a currently existing system only because such motors were more readily available. Suitable thyratron tubes are 2050's. 6SL7 tubes can be used everywhere else in the circuit. While specific tube types are indicated to aid the skilled artisan in practicing the invention, it is not intended that the invention shall be confined thereto as any tube having the desired characteristic may be used.

The polarity of the isolation transformers 269 and 269' must be properly chosen to cause the response of motor 76 to be proportional to the signals on the tongues of relays 250' and 251. The opposite polarity of the transformer connections gives "on or off" control of the motor 76 which greatly impairs the servo operation. See p. 285 in "Principles of Electron Tubes" by H. J. Reich (McGraw-Hill).

Cam 239 prevents housing 9 from being translated too far above its mid-position by opening the circuit which supplies the motor with energy to raise the housing 9. Similarly cam 73 prevents housing 9 from being moved too far below its mid-position by opening the circuit which supplies motor 76 with energy to lower the housing.

It has been mentioned that the potentiometer 241 transmits to the galvanometer 244" an indication of the relative position of housing 9 in the container 4. The Wheatstone bridge circuit for accomplishing this result is shown in Fig. 4. As housing 9 is translated vertically the potentiometer arm 242, which is fixed to shaft 62, moves along the potentiometer winding 241. This varies the resistances of the branches 273 and 274 of the bridge and thereby produces a corresponding variation in the reading of the galvanometer 244".

The method of operation of the invention when a measurement of gravity is made can now be considered. To be specific the following assumptions will be made:

(1) The gravitational torque on beam 12 is considerably greater than that exerted by spring 13.

(2) At the time the observation is begun the beam 12 has a considerable upward velocity referred to coordinates fixed in space.

(3) The ground on which container 4 is resting has a vertical oscillatory motion but the acceleration of this motion averaged over periods as long as a minute or two is practically zero. This earth motion is what is actually found on the bottom of the ocean when the bottom is soft.

Under the preceding conditions the average velocity of beam 12 with respect to container 4 will also be considerable and in an upward direction, unless it strikes a stop, until the assumed unbalanced gravitational force reduces the velocity to zero. As has been explained the servomotor 76 will translate housing 9 vertically with respect to container 4 to prevent the beam 12 from striking the stops as long as the required translation does not exceed given limits. The servo merely translates housing 9 to keep up roughly with the motion of beam 12. The question then is, whether the unbalanced gravitational force will be sufficient to reduce the initial upward velocity to zero before the limits of translation of housing 9 are reached.

It often happens that the limits will be reached first. If this is the case, the operator is warned that the housing 9 is approaching its upper limit by the reading on galvanometer 244", which indicates the relative position of housing 9 in container 4. The operator then presses switch 246 for an instant. As has been explained previously this operation applies a considerable downward force to the beam 12, which reduces its upward velocity. If necessary the operator repeatedly presses switch 246 to stop the average motion of galvanometer 244" toward the point corresponding to the translation limit of housing 9. It is important that the operator does not press switch 246 so much that the average reading of galvanometer 244" moves in the opposite direction with appreciable velocity. Such overcontrolling corresponds to giving the beam an appreciable velocity in the downward direction, which is no improvement over the preceding case. It is not difficult to avoid this overcontrolling.

We will assume that the operator succeeds in approximately stopping the average motion of galvanometer 244". The operator then discontinues operating switch 246 and awaits the results of any unbalance between the gravitational force on beam 12 and the force exerted by spring 13. Since we have assumed that the spring force is the smaller force, the beam 12 will experience a downward acceleration. This will cause it to move downwardly and, because of the operation of the servo, to make the housing 9 move downwardly with respect to container 4 on the average. This condition is indicated by motion of galvanometer 244" in the direction corresponding to downward motion. If the gravitational and spring forces are considerably unbalanced, as has been assumed, the operator soon has to press switch 247 occasionally in order to stop motion of galvanometer 244" toward the point indicating the lower limit of translation of housing 9 with respect to container 4.

We will assume that the operator succeeds in approximately stopping the average motion of galvanometer 244" or even in giving it a slight average motion in the opposite direction. We see however that because of the unbalanced downward force on beam 12, the beam will always again acquire a downward velocity which will cause galvanometer 244" to move toward the position indicating the lower translation limit. This condition requires repeated use of switch 247 and no further use of switch 246. This repeated need for the use of only switch 247 is a definite indication that the tension in spring 13 is too small. Similarly the repeated need for the use of only switch 246 is a definite indication that the tension in spring 13 is too large.

In accordance with these criteria the operator increases the tension on spring 13 by properly operating crank 23 on the self-synchronous generator 24. Again the operator determines which if any of the switches 246 or 247 it is necessary to use repeatedly. Again he makes corresponding adjustments by turning crank 23. This process is repeated until he finds a setting of the self-synchronous generator 24 at which it is no longer necessary to use either switch 246 or 247 to prevent housing 9 from reaching either of its limiting positions. The fact that if the adjustment is close enough to correct, the housing 9 will not reach either end of its range will be discussed later.

The operator then reads galvanometer 51, which indicates the averaged position of beam 12 in housing 9. If this galvanometer does not indicate that the beam is at its predetermined reference position, the operator merely adjusts crank 23 to bring galvanometer 51 to the desired galvanometer indication. The desired indication is that obtained when no light falls on the cathodes of the photoelectric cell 43, as has been mentioned. The operator then records the total angular displacement in revolutions and fractions thereof of the crank 23 from a predetermined reference position. The difference in gravity at two stations is proportional to the difference in angular displacements of crank 23 required to obtain readings at the two stations.

It will now be shown that if the setting of the self-synchronous generator 24 is close enough to correct, housing 9 will not reach either end of its range, assuming of course that the beam does not have a high initial velocity. Let us assume that the tension of spring 13 is such that if there were no earth motion the beam 12 would come to rest somewhat below its previously determined reference position but not near its lower stop 21. Let us now consider what happens when the earth has the oscillatory vertical translations previously assumed and the housing 9 is appreciably above the midpoint of its translatory range with respect to container 4. It has been explained previously that under these conditions housing 9 is translated by servomotor 76 in such a way as to keep the beam 12 near the upper stop 22. However such a position of the beam produces a spring torque on the beam less than the gravitational torque on it because it has been assumed that the equilibrium position of the beam is slightly below the reference point. Therefore the only way that the beam 12 can be kept near the upper stop is for motor 76 to give housing 9 an average downward acceleration with respect to container 4. This average downward acceleration will bring housing 9 toward the midpoint of its translatory range.

Let us now assume that housing 9 is appreciably below the midpoint of its translatory range. It has been previously explained that under these conditions housing 9 is translated by servomotor 76 in such a way as to keep the beam 12 near the lower stop 21. Such a position of the beam produces a spring torque on the beam greater than the gravitational torque on it because it has been assumed that the equilibrium position of the beam is only slightly below the reference point. Therefore, the only way that the beam 12 can be kept near the lower stop is for motor 76 to give housing 9 an average upward acceleration with respect to container 4. This average upward acceleration will bring housing 9 toward the midpoint of its translatory range.

We thus see that under the assumed conditions whenever housing 9 is not near its midposition with respect to container 4, the servomotor operates to bring it back to the midposition. Furthermore the viscous damping, which is always present in a gravity meter, between beam 12 and housing 9 will tend to make the average velocity of beam 12 the same as that of housing 9. The way in which this takes place is explained in detail in our copending application, Serial No. 696,494 for the case in which the beam is balanced, the ground is stationary and the beam does not have enough initial velocity to cause housing 9 to reach its translational limits. When there is earth motion we can therefore expect that the vertical oscillations of housing 9 in container 4 will take place about the midpoint of the allowable range of motion and will have an amplitude not very different from the amplitude of the earth motion.

A consequence of the preceding conditions is that there will be no appreciable average acceleration of housing 9 with respect to container 4. Furthermore since we have assumed (the actual case) that the ground on which container 4 rests has no appreciable average acceleration with respect to coordinates fixed in space, the housing 9 which contains the gravity meter has no appreciable average acceleration with respect to coordinates fixed in space. The averaged indications of gravity are therefore correct unless the beam strikes the stops, which we have seen the servo prevents.

The invention has been described in connection with a null reading gravity meter rather than with a deflection type of instrument. Obviously it could be used with a deflection type instrument. In this case the reading would be obtained from the averaging galvanometer 51 rather than from the angular displacement of the crank 23 required to make the galvanometer give its reference reading.

It is also obvious that the present form of the invention can be applied to other forms of gravity meters, or other force measuring instruments, just as well as the earlier form described in our copending application, Serial No. 696,494. This copending application described a modification of the earlier form of the invention to a torsion type of gravity meter.

It should be also noted that the two condensers 244 and 248 are not actually essential to the operation of the present form of the invention. These two condensers are used merely to make possible the quick application of substantial torques to the beam 12. It is possible to do this with the selsyn 24 by rotating its crank rapidly. Condensers were used in the preferred form of the invention because they required less manipulation on the part of the operator.

The present form of the invention has the following advantages over the forms described in our copending application Serial No. 696,494:

(1) It gives readings more quickly because in the present form housing 9 can be prevented from reaching its limits of translation in container 4. This is accomplished by the application of substantial torques to the beam 12 in accordance with the indications of the position of housing 9 as indicated accurately on galvanometer 244''.

(2) The present form of the invention can be operated when the ground motion is too violent to permit the operation of the earlier form. This is possible because the servo in the present form has a better response than the previous servo and thereby can prevent the beam from striking the stops under more adverse conditions.

Broadly, this invention comprehends the application of controlled accelerations of elements of measuring instruments in order to enable procurement of accurate measurements under adverse conditions.

The invention claimed is:

1. A force measuring instrument comprising, a support, a moving system mounted thereon, said moving system including a member subjected to the force to be measured whereby the system moves in response to variations in such force, means on said support for limiting the movement of the moving system relative to the support, means for displacing said support to avoid engagement of the moving system with said first mentioned means, means for applying a force to said system for accelerating the system in a direction to limit the required displacement of the support, and additional means for averaging the position of the moving system with respect to the support.

2. A force measuring instrument comprising, a support, a moving system mounted thereon, said moving system including a member subjected to the force to be measured whereby the system moves in response to variations in such force, means on said support for limiting the movement of the moving system relative to the support, means for displacing said support, said means being operable to avoid interengagement of the system with said first mentioned means and to return said support to a predetermined reference position in its range of movement when the moving system is in the midportion of its range of movement relative to said first mentioned means, means for applying a force to said system for accelerating the system in a direction to limit the required displacement of the support, and additional means for averaging the position of the moving system with respect to the support.

3. A force measuring instrument comprising, a support, a moving system mounted thereon, said moving system including a member subjected to the force to be measured whereby the system moves in response to variations in such force, stops on said support for limiting the movement of the moving system, means for displacing said support to avoid engagement of the moving system with said stops, and means for applying a force to said system for accelerating the system in a direction to limit the required displacement of the support.

4. A gravity meter including, a support, a mass mounted thereon for movement in response to variations in the force of gravity, means on said support for limiting the movement of the mass relative to the support, means for displacing said support to avoid engagement of the mass with said first mentioned means, and means for applying a force to the mass for accelerating the mass in a direction to limit the required displacement of the support.

5. A gravity meter including, a support, a mass mounted thereon for movement in response to variations in the force of gravity, means on said support for limiting the movement of the mass relative to the support, means for displacing said support to avoid engagement of the mass with said first mentioned means, means for applying a force to the mass for accelerating the mass in a direction to limit the required displacement of the support, and additional means for averaging the position of the mass with respect to the support.

6. A gravity meter including, a support, a mass mounted thereon for movement in response to variations in the force of gravity, means on said support for limiting the movement of the mass relative to the support, means for displacing said support, said means being operable to avoid interengagement of the mass with said first mentioned means and to return said support to a predetermined reference position in its range of movement when the mass is in the midportion of its range of movement relative to said first mentioned means, and means for applying a force to the mass for accelerating the mass in a direction to limit the required displacement of the support.

7. A gravity meter including, a support, a mass mounted thereon for movement in response to variations in the force of gravity, means on said support for limiting the movement of the mass relative to the support, means for displaying said support, said means being operable to avoid interengagement of the mass with said first mentioned means, to keep the mass substantially above a predetermined zero position when the support is appreciably above a predetermined reference position, and to keep the mass substantially below the predetermined zero position when the support is appreciably below the predetermined reference position, and means for applying a force to the mass for accelerating the mass in a direction to limit the required displacement of the support.

LUCIEN J. B. LA COSTE.
ARNOLD ROMBERG.

REFERENCES CITED

The following references are of record in the file of this patent:

UNITED STATES PATENTS

| Number | Name | Date |
|---|---|---|
| 2,277,509 | Clewell | Mar. 24, 1942 |
| 2,291,628 | Ising | Aug. 4, 1942 |
| 2,294,201 | Pepper | Aug. 25, 1942 |
| 2,362,135 | James | Nov. 7, 1944 |
| 2,367,126 | James | Jan. 9, 1945 |
| 2,376,459 | Stevens | May 22, 1945 |
| 2,384,739 | Hasbrook | Sept. 11, 1945 |